(12) United States Patent
Fiedler

(10) Patent No.: US 9,410,517 B2
(45) Date of Patent: Aug. 9, 2016

(54) FUEL LINE

(71) Applicant: TI Automotive (Heidelberg) GmbH, Heidelberg (DE)

(72) Inventor: Uwe Fiedler, Altlußheim (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 107 days.

(21) Appl. No.: 14/092,041

(22) Filed: Nov. 27, 2013

(65) Prior Publication Data
US 2014/0144409 A1 May 29, 2014

(30) Foreign Application Priority Data

Nov. 28, 2012 (EP) .................................... 12194581

(51) Int. Cl.
*F02M 55/02* (2006.01)
*F16L 11/00* (2006.01)
*F02M 37/00* (2006.01)
*F02M 55/00* (2006.01)
*F02M 69/46* (2006.01)
*F16L 9/02* (2006.01)
*F16L 9/04* (2006.01)

(52) U.S. Cl.
CPC ............ *F02M 55/02* (2013.01); *F02M 37/0017* (2013.01); *F02M 55/00* (2013.01); *F02M 69/462* (2013.01); *F16L 9/02* (2013.01); *F16L 9/04* (2013.01)

(58) Field of Classification Search
CPC ....... F02M 55/02; F02M 37/0017; F16L 9/20
USPC .......... 123/468, 469, 514, 516; 138/142, 143, 138/471, 151, 140, 137
See application file for complete search history.

(56) References Cited

U.S. PATENT DOCUMENTS

| | | | | | |
|---|---|---|---|---|---|
| 5,076,242 A | * | 12/1991 | Parker | .................. | F02M 55/007 123/468 |
| 5,458,156 A | * | 10/1995 | Okubo | .................... | C22C 38/40 138/140 |
| 5,685,344 A | * | 11/1997 | Iorio | ..................... | B29C 63/486 138/140 |
| 5,887,628 A | * | 3/1999 | Usui | ......................... | F16L 9/04 138/142 |

(Continued)

FOREIGN PATENT DOCUMENTS

| | | |
|---|---|---|
| GB | 2 265 961 A | 10/1993 |
| GB | 2 312 486 A | 10/1997 |
| JP | 11 044277 A | 2/1999 |

OTHER PUBLICATIONS

European Patent Office, International Search Report in European Patent Application No. 12 19 4581 Feb. 14, 2013.

*Primary Examiner* — Lindsay Low
*Assistant Examiner* — Long T Tran
(74) *Attorney, Agent, or Firm* — Brinks Gilson & Lione

(57) ABSTRACT

A fuel line, in particular a fuel line for a gasoline direct injection line system, having an inner steel tube and an outer steel tube, wherein the inner steel tube is accommodated in the outer steel tube in a force-locking manner. The inner steel tube is made of a corrosion resistant steel and the outer steel tube is made of an outer steel tube alloy, wherein a wall thickness of the inner steel tube is smaller than a wall thickness of the outer steel tube. A maximum carbon content of the outer steel tube alloy is higher than a maximum carbon content of the corrosion resistant steel. A thickness of the fuel line amounts to between 5% and 60% of an inner diameter of the motor vehicle fluid line.

15 Claims, 1 Drawing Sheet

(56) References Cited

U.S. PATENT DOCUMENTS

Figure 1:
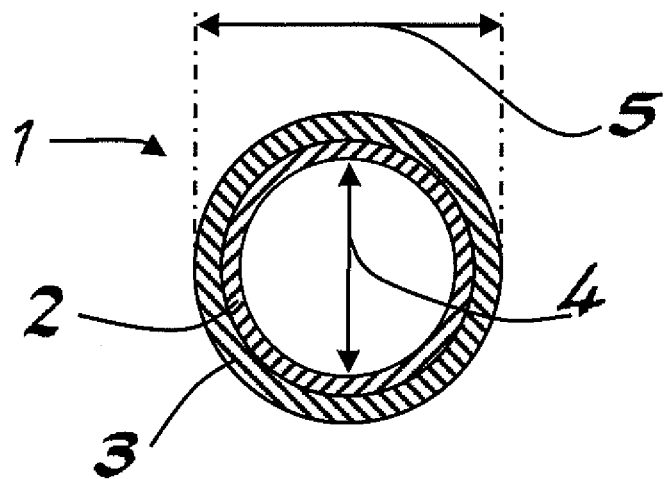

| | | | | |
|---|---|---|---|---|
| 6,085,800 | A * | 7/2000 | Usui | F02M 55/02 138/142 |
| 6,536,806 | B1 * | 3/2003 | Uematsu | F16L 58/08 285/55 |
| 6,584,959 | B2 * | 7/2003 | Stieler | F02M 37/0017 123/468 |
| 6,976,510 | B2 * | 12/2005 | Campagna | F16L 9/147 138/137 |
| 7,275,521 | B2 * | 10/2007 | Usui | F02M 55/005 123/468 |
| 7,302,936 | B2 * | 12/2007 | Stolarz | B60K 15/01 123/468 |
| 7,563,496 | B2 * | 7/2009 | Watson | B29C 63/18 405/211.1 |
| 7,922,065 | B2 * | 4/2011 | Sutherlin | B01J 19/02 228/112.1 |
| 2004/0035485 | A1 * | 2/2004 | Gleim | F16L 55/1656 138/141 |
| 2005/0031894 | A1 * | 2/2005 | Klos | B32B 1/08 428/659 |
| 2005/0284447 | A1 | 12/2005 | Usui et al. | |
| 2006/0113696 | A1 * | 6/2006 | Aisenbrey | B29C 47/0004 264/104 |

* cited by examiner

FUEL LINE

CROSS-REFERENCE TO RELATED APPLICATIONS

This patent application claims priority pursuant to Title 35 USC Section 119 to European Patent Application No. 12 194 581.0-1603 filed Nov. 28, 2012 entitled "Fuel Line," the entire specification and drawings of which are hereby incorporated by reference herein as if fully set forth.

DESCRIPTION

The invention concerns a fuel line, in particular a fuel line for a gasoline direct injection line system.

Fuel lines of the type specified above are fundamentally known in the field. These fuel lines may exhibit a multi-layered structure, in order to reliably withstand the pressures prevalent in gasoline direct injection line systems. The high extent of material usage in the fuel lines known from the field, necessary for the production thereof, is a disadvantage. As a result, the fuel lines known in the field are disadvantageously heavy.

The invention therefore addresses the technical problem of providing a fuel line of the type specified above, distinguished by a high pressure resistance and a limited weight.

In order to solve the technical problem, the invention teaches of a fuel line, in particular a fuel line for a gasoline direct injection line system, having an inner steel tube and an outer steel tube, wherein the inner steel tube is accommodated in the outer steel tube in a force-locking manner, wherein the inner steel tube is made of a corrosion resistant steel, wherein the outer tube is made of a outer steel tube alloy, wherein a wall thickness of the inner steel tube is less than the wall thickness of the outer steel tube, wherein a maximum carbon content of the outer steel tube is greater than a maximum carbon content of the corrosion-free steel, and wherein a thickness of the motor vehicle fluid line amounts to between 5% and 60% of an inner diameter of the motor vehicle fluid line. Preferably the fuel line is used in internal combustion engines, in particular in Otto engines having a gasoline direct injection. It is recommended that the fuel line is pressure resistant up to a pressure of 200 bar, and preferably up to 250 bar. The corrosion resistant steel is preferably a stainless steel and/or preferably resistant to fuels.

It is particularly preferred that the inner steel tube is irreversibly disposed in the outer steel tube. For practical purposes, an outer sheathing of the inner steel tube rests in a form-locking manner against an inner surface of the outer steel tube. It is particularly preferred that the inner steel tube lie against the outer steel tube without gaps. It is within the scope of the invention that an inner surface or inner side of the inner steel tube, which limits a flow channel in the fuel line, is designed without a coating. Preferably, no additional coatings are applied to the flow channel-side inner surface of the inner steel tube.

Ideally, the wall thickness of the outer steel tube is up to 1.5 times, preferably up to 2 times, and according to one embodiment, up to three times the wall thickness of the inner steel tube. The thickness of the fuel line means, in particular, a sum of the wall thickness of the inner steel tube and the wall thickness of the outer steel tube. Preferably, the thickness of the fuel line amounts to 10-60% and preferably 20-50% of the inner diameter of the fuel line. Preferably the inner diameter of the fuel line is an inner diameter of the inner steel tube, or the diameter of the flow channel, respectively. It is particularly preferred that the flow channel exhibit a circular cross-section.

According to one embodiment example, the thickness of the fuel line is at least 0.5 mm. In a preferred embodiment, the fuel line exhibits a thickness of 0.5-2.5 mm, and ideally 1.0-1.5 mm.

Advantageously, the inner steel tube exhibits a wall thickness of 0.05 mm-1.00 mm. Preferably, the inner steel tube has a wall thickness of 0.10 mm-1.00 mm, and particularly preferably, 0.5 mm-1.00 mm. For practical purposes, the outer steel tube has a wall thickness of 0.3 mm-2 mm. Ideally, the wall thickness of the outer steel tube is 0.5 mm-1.5 mm.

According to one embodiment, the outer steel tube has an outer diameter of up to 20 mm and/or the inner steel tube has an inner diameter of up to 10 mm. Ideally, the outer steel tube has an outer diameter of up to 16 mm, and preferably up to 10 mm. It is within the scope of the invention that the inner steel tube has an inner diameter of up to 8 mm, and preferably up to 5 mm. It is particularly preferred that the inner diameter of the inner steel tube amounts to 5 mm, or approximately 5 mm, respectively. The outer diameter of the outer steel tube preferably amounts to between 6 mm and 10 mm, ideally between 7 mm and 9 mm, and particularly preferably 8 mm, or approximately 8 mm, respectively.

Preferably, the maximum carbon content of the corrosion resistant steel is less than or equal to 0.07% by weight, wherein the maximum carbon content of the outer steel tube alloy is less than or equal to 0.10% by weight. The maximum carbon content, in the scope of the invention, of the corrosion resistant steel, or the outer steel tube alloy, respectively, means the highest amount that can be contained in the corrosion resistant steel, or the outer steel tube alloy, respectively. The outer steel tube consists, for practical purposes, of the outer steel tube alloy. The corrosion resistant steel preferably contains, aside from iron, a chrome content of 17.0-19.5% by weight, and a nickel content of 8.0-10.5% by weight. By way of example, the corrosion resistant steel is a steel having the substance no. 1.4301 according to DIN EN 10216-5. Preferably the outer steel tube alloy has a maximum carbon content of 0.08% by weight. The outer steel tube alloy is, by way of example, a steel labeled as DC03 or DC04, according to EN 10139.

It is within the scope of the invention that a tensile strength of the outer steel tube alloy is lower than a tensile strength of the corrosion resistant steel. Preferably the corrosion resistant steel exhibits a tensile strength of up to 750 N/mm$^2$ and/or the outer steel tube alloy, a tensile strength of up to 370 N/mm$^2$. Preferably, the tensile strength of the corrosion resistant steel is greater than 500 N/mm$^2$. The outer steel tube alloy preferably exhibits a tensile strength of at least 270 N/mm$^2$, and preferably of at least 350 N/mm$^2$.

According to a preferred embodiment, the inner steel tube is a seamless steel tube. Preferably, the inner tube is a single-walled seamless steel tube. Advantageously, the inner steel tube is a single-walled steel tube, produced from a steel band by means of rolling, wherein the inner steel tube is designed as a welded, single-walled steel tube. For practical purposes, in order to form the single-walled, welded steel tube, edges of the steel band bordering one another are welded together. It is possible that the inner steel tube is a double-walled, preferably soldered, steel tube. It is recommended that for the production of the double-walled steel tube, a surface of a steel band is coated with a solder, such as copper, for example. The steel band, coated with a solder, is rolled up such that the copper layer is located on an outer surface and/or an inner surface of the double-walled steel tube. A soldering of the two tube walls by means of the solder layer then follows.

It is recommended that the outer steel tube is a steel tube preferably produced from a steel band, wherein the outer steel tube is designed as a welded, single-walled, steel tube. The single-walled, welded steel tube forming the outer steel tube can be obtained, expediently, from a steel band formed by the outer steel tube alloy. The steel band is then rolled such that longitudinal edges of the steel band abut one another, and are welded together to form the single-walled, welded steel tube. It is within the scope of the invention that the outer steel tube is a double-walled steel tube, preferably produced by rolling a steel band. Ideally, at least one surface of the steel band is coated with a solder coating, such as copper, for example, following which the coated steel band is rolled to form a double-walled steel tube in such a manner that the solder coating is located on an inner surface and/or outer surface of the double-walled steel tube. Ideally, the two tube walls are soldered to one another by means of the solder coating.

It is possible that the inner steel tube is soldered to the outer steel tube. Ideally, a solder coating is applied to a surface of the outer steel tube facing the inner steel tube and/or to an outer surface of the inner steel tube, at least in sections, this coating preferably being a copper layer, by means of which solder coating, the outer steel tube is connected to the inner steel tube. Advantageously, the corrosion resistant steel of the inner steel tube is attached to the outer steel tube alloy of the outer steel tube in a firmly bonded manner.

It is within the scope of the invention that the inner steel tube is preferably pressed into the outer steel tube without soldering. For practical purposes, the inner steel tube is inserted in the outer steel tube, wherein the inner diameter of the outer steel tube is at least as large as the outer diameter of the inner steel tube. By means of pulling, or by means of a pulling process, respectively, the outer steel tube is deformed, or narrowed, respectively, over the course of preferably its entire length, or substantially the entirety of its length, respectively, such that the inner surface of the outer steel tube lies in a form-locking and force-locking manner on the outer surface of the inner steel tube.

According to one embodiment, a reinforcement layer is disposed on the outer steel tube. It is possible that the reinforcement layer is made of a metal alloy, for example steel, whereby said metal alloy preferably exhibits a greater tensile strength than that of the outer steel tube alloy. It is preferred that the reinforcement layer is designed as a single-walled, preferably welded, tube. According to another embodiment, the reinforcement layer is designed as a double-walled, preferably soldered, tube. In an advantageous manner, the mechanical stability of the fuel line is improved by the reinforcement layer.

The invention is based on the understanding that a fuel line according to the invention is distinguished by a high resistance to pressure while at the same time having a low weight, or use of materials, respectively. The substantial aspect of the fuel line according to the invention is that the inner steel tube functions primarily as a protective layer, against corrosion, for the outer steel tube, and can be designed with a substantially smaller wall thickness than the outer steel tube. In this mariner, the production of the fuel line according to the invention is extremely economical. In addition, a corrosion resistant fuel line is provided by means of the design according to the invention for the inner steel tube and the outer steel tube, with which fuel, containing corrosive components, preferably Otto fuel, can be readily handled. The fuel line according to the invention is distinguished by a high degree of mechanical stability and durability, which readily withstands the rhythmic or repeated pressure fluctuations.

In the following, the invention shall be explained in greater detail, based on drawings depicting merely an embodiment example. They show:

FIG. 1 a fuel line according to the invention in a first embodiment, and

Figure 2:
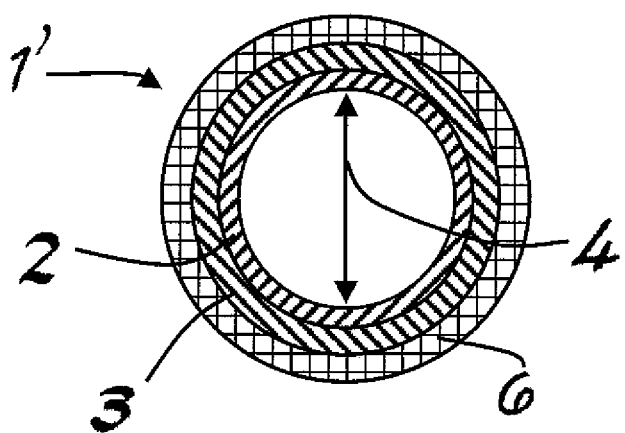

FIG. 2 a fuel line according to the invention in a second embodiment.

A fuel line 1 is depicted in FIG. 1, which exhibits an inner steel tube 2 and an outer steel tube 3. Preferably, and according to FIG. 1, the fuel line 1 consists solely of the preferably seamless inner steel tube 2 and the preferably double-walled outer steel tube 3. The inner steel tube 2 has an inner diameter 4 of 5 mm according to FIG. 1. The outer diameter 5, determined by the outer steel tube 3, is 8 mm in the embodiment example according to FIG. 1. In FIG. 1 it is shown that a wall thickness of the inner steel tube 2 is 0.7 mm, while a wall thickness of the outer steel tube 3 is 0.8 mm. The fuel line 1 according to FIG. 1 is distinguished by a pressure resistance of up to 250 bar.

The structure of the fuel line 1' according to FIG. 2 corresponds to the design of the inner steel tube 2 and the outer steel tube 3 of the fuel line 1 according to FIG. 1. In addition to the inner steel tube 2 and the outer steel tube 3, the fuel line 1' according to FIG. 2 exhibits a reinforcement layer 6, which lies in a form-locking manner on the outer surface of the outer steel tube 3 according to FIG. 2. The fuel line 1' exhibits an additional improvement to the mechanical stability as a result of the reinforcement layer 6.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A fuel line, in particular a fuel line for a gasoline direct injection line system, having an inner steel tube and an outer steel tube, wherein the inner steel tube is accommodated in a force-locking manner in the outer steel tube, wherein the inner steel tube is made of a corrosion resistant steel, wherein the outer steel tube is made of an outer steel tube alloy, wherein a wall thickness of the inner steel tube is less than a wall thickness of the outer steel tube, wherein a maximum carbon content of the outer steel tube alloy is greater than a maximum carbon content of the corrosion resistant steel, and wherein a thickness of the fuel line is between 5% and 60% of an inner diameter of the fuel line.

2. The fuel line according to claim 1, wherein the thickness of the fuel line is at least 0.5 mm.

3. The fuel line according to claim 1, wherein the inner steel tube has a wall thickness of 0.05 mm-1.00 mm.

4. The fuel line according to claim 1, wherein the outer steel tube has a wall thickness of 0.3 mm-2 mm.

5. The fuel line according to claim 1, wherein the outer steel tube has an outer diameter of up to 20 mm and/or wherein the inner steel tube has an inner diameter of up to 10 mm.

6. The fuel line according to claim 1, wherein the maximum carbon content of the corrosion resistant steel is less than or equal to 0.07% by weight, and wherein the maximum carbon content of the outer steel tube alloy is less than or equal to 0.10% by weight.

7. The fuel line according to claim 1, wherein a tensile strength of the outer steel tube alloy is lower than a tensile strength of the corrosion resistant steel.

8. The fuel line according to claim 1, wherein the inner steel tube is a seamless steel tube.

9. The fuel line according to claim 1, wherein the inner steel tube is a single-walled steel tube, produced from a steel band by means of rolling, wherein the inner steel tube is designed as a welded, single-walled steel tube.

10. The fuel line according to claim 1, wherein the outer steel tube is a steel tube, preferably produced from a steel band, wherein the outer steel tube is designed as a welded, single-walled steel tube.

11. The fuel line according to claim 1, wherein the outer steel tube is a double-walled steel tube, preferably produced by rolling a steel band.

12. The fuel line according to claim 1, wherein the inner steel tube is soldered to the outer steel tube.

13. The fuel line according to claim 12, wherein a solder layer, preferably a copper layer, is applied, at least in sections, on a surface of the outer steel tube facing the inner steel tube and/or on an outer surface of the inner steel tube, by means of which solder layer, the outer steel tube is attached to the inner steel tube.

14. The fuel line according to claim 1, wherein the inner steel tube is pressed into the outer steel tube, preferably without soldering.

15. The fuel line according to claim 1, wherein a reinforcement layer is disposed on the outer steel tube.

\* \* \* \* \*